US006550246B2

(12) United States Patent
Barr et al.

(10) Patent No.: US 6,550,246 B2
(45) Date of Patent: Apr. 22, 2003

(54) MASTER CYLINDER WITH EXTENDED PISTON

(75) Inventors: Paul L. Barr, Clarkston, MI (US); Tim M. Dangel, Oxford, MI (US); Paul M. Regula, Sterling Heights, MI (US)

(73) Assignee: Automotive Products (USA), Inc., Auburn Hills, MI (US)

( * ) Notice: Subject to any disclaimer, the term of this patent is extended or adjusted under 35 U.S.C. 154(b) by 0 days.

(21) Appl. No.: 09/906,304

(22) Filed: Jul. 16, 2001

(65) Prior Publication Data

US 2003/0010028 A1 Jan. 16, 2003

(51) Int. Cl.[7] .................................................. B60T 11/26
(52) U.S. Cl. ........................................................... 60/588
(58) Field of Search ............................ 60/588, 591, 562

(56) References Cited

U.S. PATENT DOCUMENTS

| | | | |
|---|---|---|---|
| 4,414,811 A | * 11/1983 | Gaiser | 60/562 |
| 4,590,765 A | 5/1986 | Leigh-Monstevens | 60/588 |
| 4,872,396 A | 10/1989 | Wimbush | |
| 4,941,323 A | 7/1990 | Leigh-Monstevens | |
| 5,121,686 A | 6/1992 | Schonlau et al. | 92/163 |
| 5,251,446 A | 10/1993 | Mori et al. | 60/33 |
| 5,704,462 A | * 1/1998 | Grosspietsch et al. | 192/85 C |

FOREIGN PATENT DOCUMENTS

| | | |
|---|---|---|
| DE | 196 52 486 A 1 | 12/1996 |
| GB | 1065599 | 4/1967 |
| GB | 2017240 | 10/1979 |
| GB | 2146082 A | 4/1985 |
| GB | 2295428 | 11/1995 |
| WO | WO97/01469 | 1/1997 |

* cited by examiner

*Primary Examiner*—Edward K. Look
*Assistant Examiner*—Thomas E. Lazo
(74) *Attorney, Agent, or Firm*—Young & Basile P.C.

(57) ABSTRACT

A master cylinder assembly in which the casing defines an annular seal groove defining a forward bore portion forwardly of the annular groove and a rearward bore portion rearwardly of the annular groove. The front end of the piston in the retracted position of the piston is received in the forward bore portion to provide total bearing support for the piston and axial grooves are provided in the forward bore portion to allow recuperative fluid to flow from the associated reservoir and through the axial grooves to the forward bore portion forwardly of the retreating piston.

14 Claims, 4 Drawing Sheets

MASTER CYLINDER WITH EXTENDED PISTON

FIELD OF THE INVENTION

This invention relates to master cylinders and more particularly to master cylinders especially suited for use in a master/slave hydraulic control system.

Master cylinders are in common usage such, for example, as in combination with a slave cylinder to provide the actuating mechanism for a mechanical clutch of a motor vehicle.

A typical master cylinder assembly includes a casing structure defining a cylindrical bore and a piston slidably mounted in the bore. Pressurized hydraulic fluid is discharged from the cylindrical bore for delivery to the slave cylinder in response to stroking reciprocal movement of the piston in the bore. Effective operation of the cylinder assembly requires the establishment of an effective seal between the piston and the bore of the cylinder. This seal may either be mounted in an external groove in the piston or in an internal groove in the cylindrical wall defining the bore. In assemblies utilizing an internal groove in the cylindrical wall defining the bore, the groove defines a forward bore portion forwardly of the groove and a rearward bore portion rearwardly of the groove in which the piston is received in its retracted position. The forward end of the piston in the retracted position of the piston is typically proximate the groove but rearwardly of the forward bore portion to allow flow of recuperative fluid from the associated reservoir to a position forwardly of the piston as the piston retreats from an extended position to its retracted position whereby to ensure that the bore forwardly of the piston remains full at all times. This arrangement has the disadvantage that the front end of the piston is unsupported as the piston begins its forward stroke and remains unsupported until the piston moves through a transient region and enters the forward bore portion. During movement of the piston through the transient region, the piston may assume an angled disposition relative to the center line of the cylinder with resultant potential leakage conditions.

SUMMARY OF THE INVENTION

This invention relates to an improved master cylinder for use in a master cylinder/slave cylinder assembly.

More particularly, this invention relates to a master cylinder mounting the seal in an internal groove in the cylinder and yet providing total support for the piston throughout its stroke.

The master cylinder of the invention is of the type comprising a casing defining a bore and a piston mounted in the bore for stroking movement between rearwardly retracted and forwardly extended positions. The casing further defines an annular groove surrounding the bore between forward and rearward ends of the bore and defining a forward bore portion forwardly of the groove and a rearward bore portion rearwardly of the groove, and further defines a port connecting the annular groove with a reservoir for containing hydraulic fluid. A seal assembly is positioned in the groove.

According to the invention, the piston has a forward end positioned forwardly of the groove in a rearward section of the forward bore portion with the piston in its retracted position whereby, in its retracted position, a rear end of the piston is guided in the rearward bore portion and the forward end of the piston is guided in the rearward section of the forward bore portion, and axial groove means are provided at the interface between the forward end of the piston and the rearward section of the forward bore portion establishing communication, with the piston in its retracted position, between the bore forwardly of the piston and the annular groove. This arrangement allows the piston to be totally supported in the bore at all times and yet retains the ability to deliver recuperative fluid forwardly of the piston as the piston retreats toward its retracted position.

According to a further feature of the invention, the groove means comprises a series of circumferentially spaced, axially extending grooves in the rearward section of the forward bore portion. This arrangement provides an efficient means of delivering recuperative fluid forwardly of the retreating piston.

According to a further feature of the invention, the axial grooves extend into the forward bore portion forwardly of the rearward section of the forward bore portion and, in the disclosed embodiment, the axial grooves are substantially coextensive with the forward bore portion. This specific groove configuration ensures adequate recuperative flow irrespective of the extended forward position of the piston prior to retreating toward its retracted position.

According to a further feature of the invention, the casing defines an annular shoulder defining a forward end of the annular groove and an annular lip projecting rearwardly from the shoulder into the annular groove; the seal assembly includes an annular seal positioned in the annular groove against the annular lip; the annular lip is crenellated and coacts with the seal to define a plurality of circumferentially spaced crenel passages therebetween providing fluid communication between the reservoir port and the axial grooves; and the seal includes an outer flexible lip movable in response to variations in fluid pressure between an outwardly flexed position blocking fluid communication between the reservoir port and the crenel passages and an inwardly flexed position allowing fluid communication between the reservoir port and the crenel passages and thereby between the reservoir port and the axial grooves. This arrangement selectively allows flow of recuperative fluid into the forward portion of the bore ahead of the retreating piston.

According to a further feature of the invention, the casing comprises a two-part structure including a molded front part and a molded rear part; and the front and rear parts include coacting means for joining the parts in a configuration in which the front part defines the forward bore portion and the axial grooves, the rear part defines the rearward bore portion, and the parts coact to define the annular groove. This specific construction provides a ready and inexpensive means of constructing the master cylinder assembly.

According to a further feature of the invention, the annular shoulder comprises a forward annular shoulder; the annular groove is further defined by a rearward annular shoulder defining a rearward end of the groove and a cylindrical groove surface interconnecting the forward and rearward annular shoulders; and in the joined configuration of the front and rear parts the forward annular shoulder, the annular lip, the reservoir port, and the cylindrical groove surface are defined by the front part and the rear annular shoulder is defined by the rear part. This specific part configuration allows the master cylinder to be readily assembled with a telescopic movement.

According to a further feature of the invention, the annular seal comprises a primary seal, and the master cylinder further includes a secondary annular seal positioned in the annular groove against the rearward annular shoulder, rearwardly of the primary seal, and rearwardly of the reservoir port. This arrangement allows the use of primary and secondary seals to minimize leakage between the piston and the bore.

According to a further feature of the invention, the master cylinder further includes an annular spacer positioned in the annular groove between the primary seal and the secondary seal proximate the reservoir port, and the spacer provides passage means allowing the passage of fluid therethrough. This arrangement allows the spacer to maintain the primary and secondary seals in their defined positions and further allows the ready flow of recuperative fluid into the area in the bore ahead of the retreating piston.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
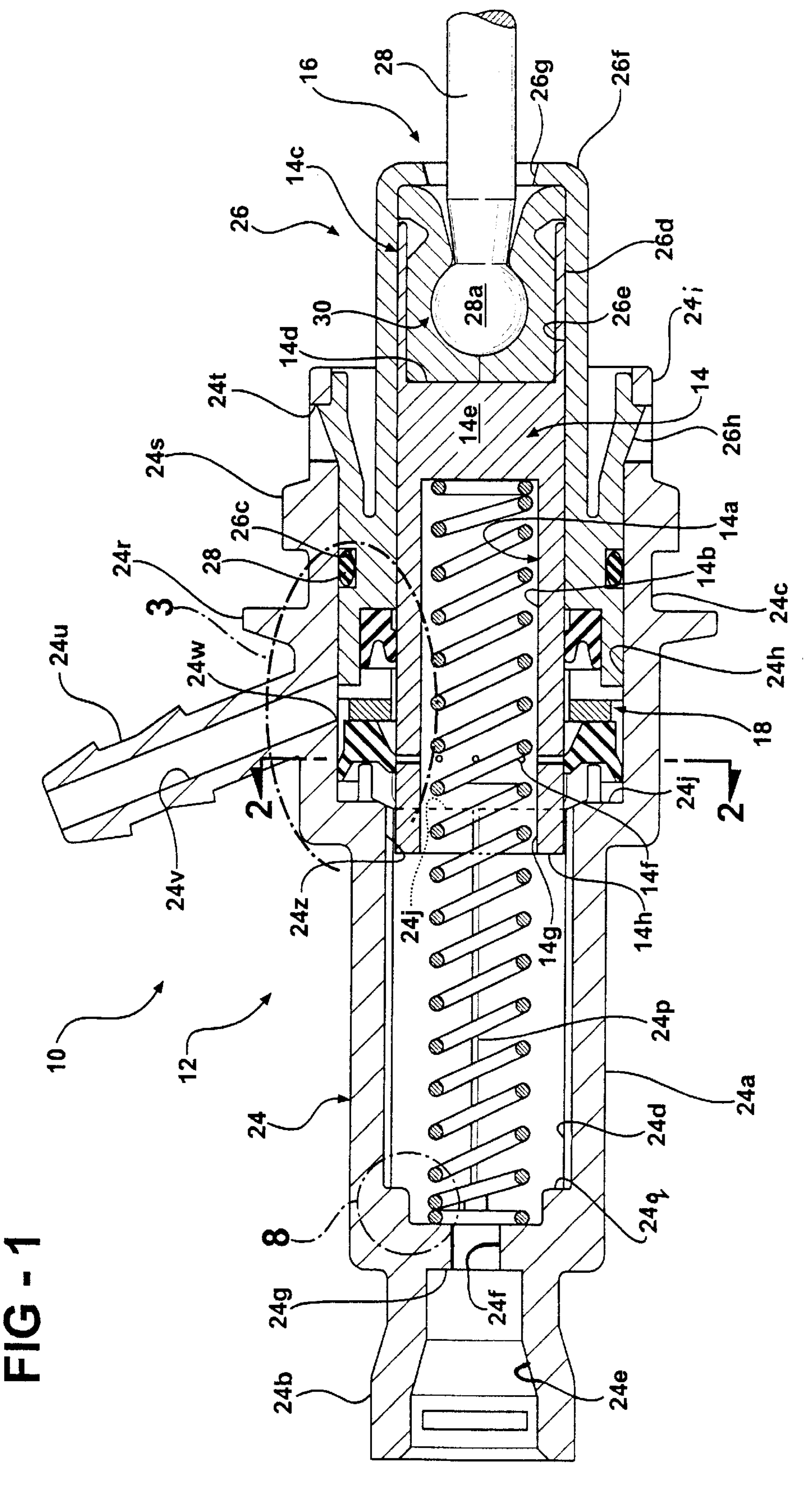
FIG. 1 is a cross sectional view of a master cylinder according to the invention.
Figure 2:
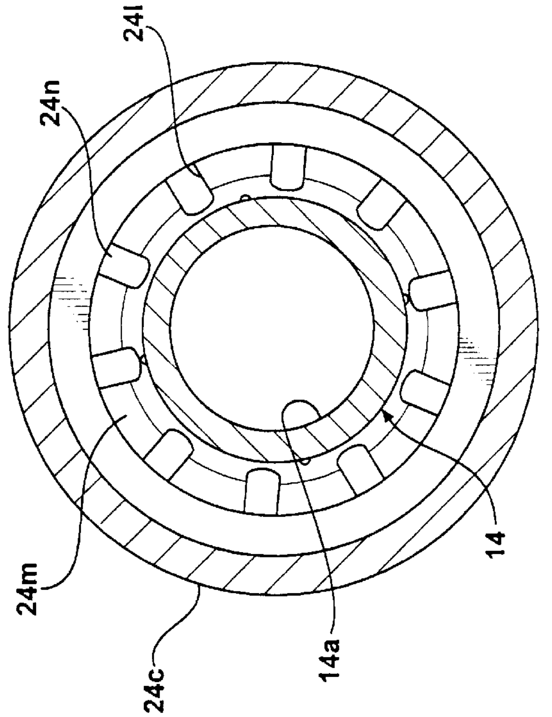
FIG. 2 is a cross sectional view taken on the line 2—2 of FIG. 1 and omitting a primary seal for purposes of clarity.
Figure 4:
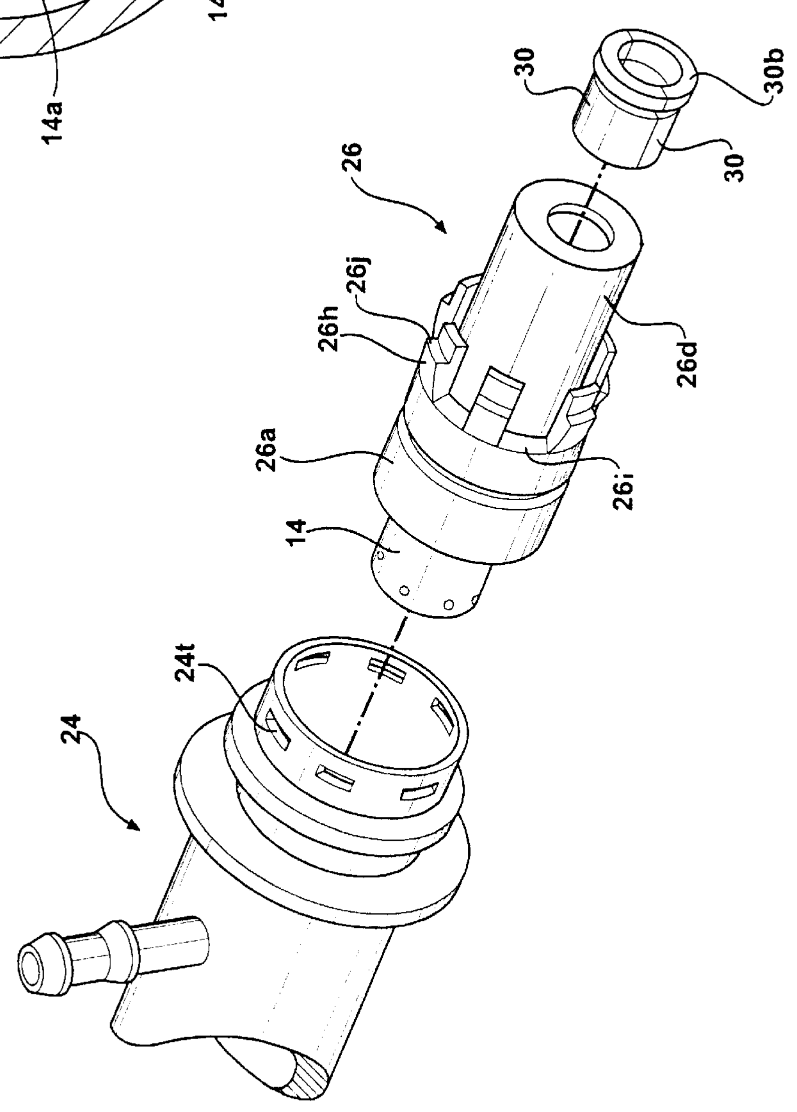
FIG. 4 is an exploded view of a casing structure utilized in the invention master cylinder.

The master cylinder 10 of the invention may be utilized in a master/slave cylinder hydraulic system where it is desired to deliver pressurized fluid from a master cylinder in response to operator input via a piston rod for delivery to a slave cylinder which functions to perform a work operation. The master cylinder of the invention may be used, for example, in a motor vehicle clutch system wherein a clutch pedal of the vehicle is utilized to actuate the master cylinder to deliver pressurized fluid to a slave cylinder to engage and disengage the clutch.

The master cylinder 10 of the invention, broadly considered, includes a casing structure 12, a piston 14, a piston rod assembly 16, a seal assembly 18, and a spring 22.

Casing structure 12 includes a front body 24 and a rear piston retainer part 26 both formed in a suitable molding operation of a suitable plastic material such for example as polytetrafluoro ethylene or glass reinforced nylon.

Body 24 has a generally tubular configuration and includes a main body portion 24*a*, a forward fitting portion 24*b*, and an enlarged rear portion 24*c*. Main body portion 24*a* defines a central bore 24*d*, fitting portion 24*b* defines a central bore 24*e* communicating with bore 24*d* via a port 24*f* extending through a forward end wall 24*g*, and rear portion 24*c* defines a bore 24*h* opening at the rearward annular end 24*i* of the rear portion. An annular shoulder 24*j* interconnects bore 24*d* and bore 24*h* and an annular lip 24*k* projects rearwardly from shoulder 24*j*. Annular lip 24*k* includes a plurality of circumferentially spaced cutouts 24*l* giving the lip a crenelated or castellated configuration including circumferentially spaced land portions 24*m* alternating with grooves or passages 24*n*. A plurality of axially extending circumferentially spaced radially inwardly opening grooves 24*p* are provided in bore 24*d* and extend from shoulder 24*j* forwardly to a juncture with a respective plurality of circumferentially spaced ribs 24*q* projecting forwardly from wall 24*g* proximate the forward end of bore 24*d*.

Body 24 further includes annular external mounting flanges 24*r* and 24*s* to facilitate mounting of the casing to the associated motor vehicle structure, and a plurality of circumferentially spaced rectangular openings 24*t* positioned in rear portion 24*c* proximate annular rear end 24*i*, and a spigot or fitting 24*u* defining an angled central reservoir bore 24*v* opening at port 24*w* in bore 24*h* and arranged for communication with a suitable reservoir (not shown) for containing hydraulic fluid.

Piston retainer 26 has a generally tubular configuration and includes a forward portion 26*a* defining an internal forwardly opening groove 26*b* and an external groove 26*c* receiving an "O" ring 28, a rear main body portion 26*d* defining a cylindrical bore 26*e* and including a rear wall 26*f* defining a central opening 26*g*; and a plurality of circumferentially spaced spring fingers or prongs 26*h* extending rearwardly from an annular shoulder 26*i* interconnecting portions 26*a* and 26*d*.

Piston 14 may be formed of a suitable plastic, aluminum, or other metal material and includes a forward portion 14*a* defining a blind forwardly opening central bore 14*b* and a rearward portion 14*c* defining a blind rearwardly opening central bore 14*d*. A partition 14*e* separates bores 14*b* and 14*d* and a plurality of circumferentially spaced generally circular apertures or ports 14*f* extend through the tubular wall of forward portion 14*a* proximate the forward annular end 14*g* of the piston. The outer periphery of piston 14 has a purely cylindrical geometry generally conforming to the geometry of the cylindrical bores 26*d* and 26*e*.

Piston rod assembly 16 includes a piston rod 28 and piston rod retainers 30. Piston rod 28 is of known form and is intended for coaction at its rearward end, for example, with a clutch pedal of a motor vehicle. The forward end of the piston rod has a ball configuration 28*a*. Piston rod retainers 30 are designed to coact to encapsulate the ball 28*a* of the piston rod and have cylindrical configurations sized to fit within blind bore 14*d* with the ball 28*a* of the piston rod entrapped therebetween.

Seal assembly 18 includes a primary seal 32, a secondary seal 34, and a spacer 36.

Primary seal 32 is formed of a suitable elastomeric material such for example as EPDM material and has an annular configuration. Seal 32 includes an annular main body portion 32*a*, an outer lip portion 32*b*, and an inner lip portion 32*c*. Outer lip portion 32*b* has a thinner cross sectional configuration than inner lip portion 32*c* so as to be more readily flexed.

Secondary seal 34 is also formed of a suitable elastomeric material such for example as EPDM and has an annular configuration. Secondary seal 34 includes a main body portion 34*a*, an outer lip portion 34*b*, and an inner lip portion 34*c*.

Spacer 36 has an annular configuration and is formed of a suitable plastic material in a suitable molding operation.

Spacer 36 includes an annular main body portion 36*a* and a plurality of circumferentially spaced lug portions 36*b* projecting rearwardly from a rear face 36*c* of the main body portion and each including a crenel portion 36*d* projecting radially outwardly beyond the outer periphery 36*e* of the main body portion to provide a castellated or crenellated configuration to the outer periphery of the spacer. The outer diameter of the spacer as defined by the radially outwardly projecting crenel portions 36*d* corresponds generally to the diameter of bore 24*h* of the rear portion of the body of the casing structure and the inner diameter 36*f* of the spacer is somewhat larger than the diameter of piston 14 so that piston 14 does not contact spacer inner diameter 37*f.*

Spring 22 is formed of a suitable metallic material and has a known coil configuration.

Assembly

In the assembled configuration of the master cylinder, piston retainer 26 is telescopically received in bore 24*h* and is locked in position within the body by the engagement of shoulders 26*j* defined on fingers 26*h* against the rearward edges of openings 24*t*; piston 14 is slidably received in bores 24*d* and 24*e*; piston rod retainers 30 are positioned in blind bore 14*d*; piston rod 28 extends through opening 26*g* with its spherical forward end 28*a* encapsulated by retainers 30; primary seal 32 is positioned in bore 24*h* with outer lip 32*b* flexibly and sealingly engaging bore 24*h*, inner lip 32 flexibly and sealingly engaging the outer periphery of piston 14, and a crotch 32*d* defined between inner and outer lips 32*b* and 32*c* seated against the land portions 24*m* of lip 24*k*; spacer 36 is positioned in bore 24 against primary seal 32 with the forward annular face 36*g* of main body portion 36*a* seated against rear annular face 32*e* of the main body portion 32*a* of primary seal 32, the outer diameter of crenels 36*d* seated in bore 24*h* in axial alignment with reservoir port 24*w*, inner diameter 36*f* positioned in outwardly spaced relation to the outer diameter of piston 14 to define an annular passage 40 between the piston and the spacer, and the rearward face 36*h* of crenels 36*d* seated against the annular forward edge 26*k* of piston retainer 26; secondary seal 34 is positioned in groove 26*b* with the rear annular face 34*d* of the main body of the seal seated against an annular shoulder 26*x* defining the rearward extent of groove 26*b*, the outer face 34*e* of the main body of the seal positioned against surface 26*y* defining the outer periphery of groove 26*b*, outer lip 34*b* flexibly and sealingly positioned in the juncture between the rearward face 36*i* of the spacer lugs 36*b* and the surface 26*y*, and inner lip 34*c* flexibly and sealingly engaging the outer periphery of piston 14; and spring 22 is positioned at its rearward end in blind bore 14*b* and at its forward end against end wall 24*g* to resiliently maintain the piston in a rearwardly retracted position wherein the annular rear surface 30*b* of piston rod retainers 30 engage wall 26*f*, apertures 14*f* are positioned immediately rearwardly of the sealing line on the piston of inner lip 32*c* of the primary seal, the rear portion of the piston is slidably received in bore 26*e*, and the forward end 14*g* of the piston is slidably received in a rear section 24*z* of bore 24*d*. It will be seen that body 24 and piston retainer 26 coact to define a casing structure having a central bore defined by bores 24*d*/26*e*, and that surfaces 24*j*, 24*h*, 26*k*, 26*y* and 26*x* combine in the assembled master cylinder to define an annular groove positioned in surrounding relation to the bore 24*d*/26*e* between the ends of the bore in which the primary seal, spacer, and secondary seal are positioned in surrounding relation to the piston.

Operation

With the piston in the fully retracted position seen in FIG. 1, it will be seen that the reservoir and the bore of the casing are connected by bore 24*v*, spaces between the crenels of the spacer, passage 40, and apertures 14*f* so that the reservoir and casing structure may equalize to ensure that the bore of the casing is filled at all times. The described fluid passage between the reservoir and the bore of the cylinder also facilitates initial filling of the cylinder.

When the piston is moved forwardly in the cylinder in response to, for example, depression of the clutch pedal of the associated motor vehicle, apertures 14*f* immediately move beyond the effective sealing edge of the inner lip 32*c* of the primary seal so that communication between the reservoir and the bore of the cylinder is terminated and so that, as the piston continues to move forwardly, the fluid forwardly of the piston is pressurized for delivery to the slave cylinder and ultimate actuation of the associated clutch of the motor vehicle.

The forward movement of the piston is resisted by compression of the spring 22 and the forward or extended position of the piston is defined by engagement of the annular front edge 14*h* of the piston with ribs 24*q*.

It will be seen that as the piston moves from its retracted to its extended position the front end of the piston is at all times firmly guided by bore 24*d* and the rear end of the piston is at all times firmly guided by bore 26*e*.

In a normal retraction of the piston wherein the operator's foot remains on the clutch pedal and allows the system to gradually return to a retracted position, fluid from the slave cylinder and the interconnecting conduit flow into the bore 24*d* behind the retreating piston to ensure that the bore remains filled.

Figure 3:
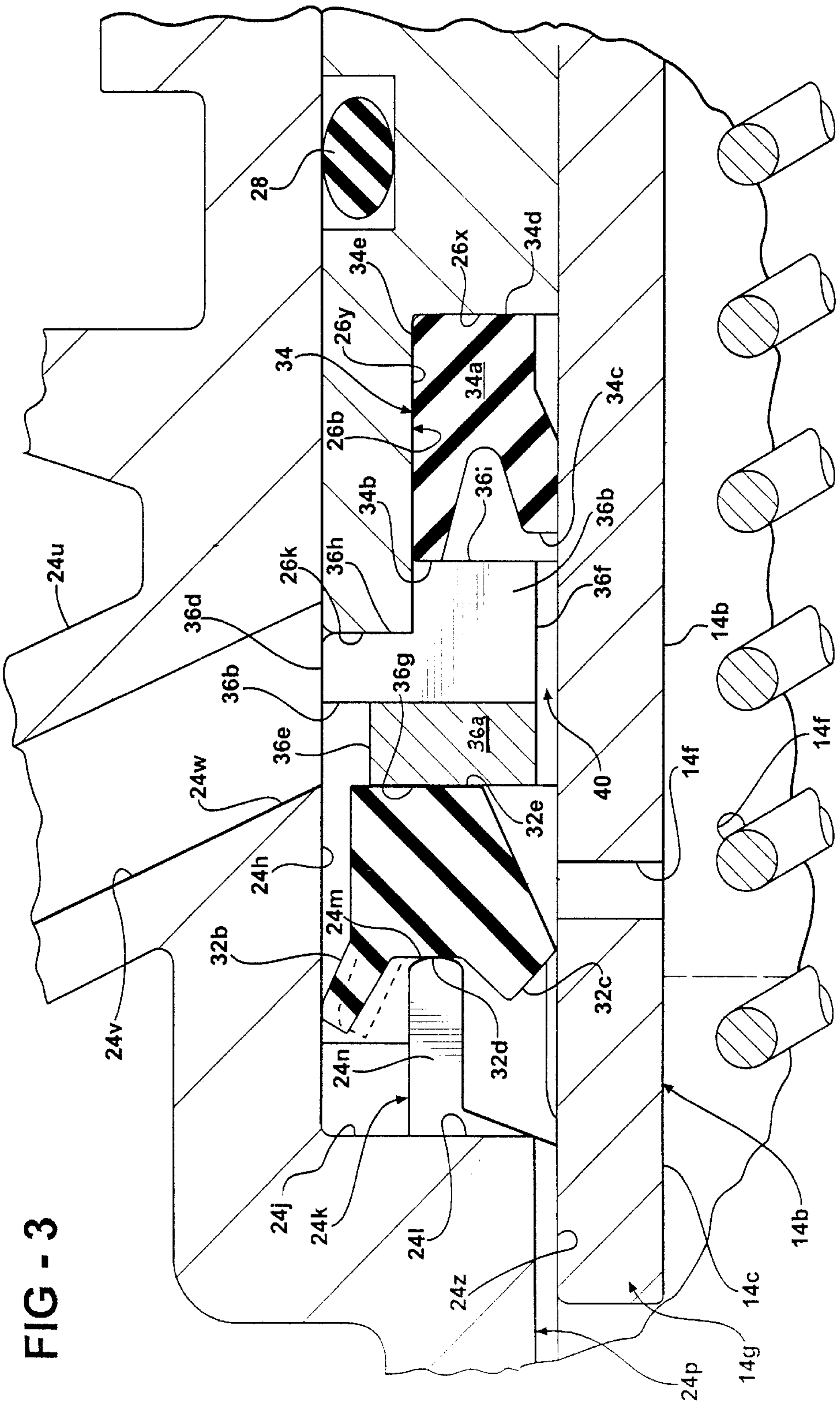
FIG. 3 is a detail view taken within the circle 3 of FIG. 1.
Figure 5:
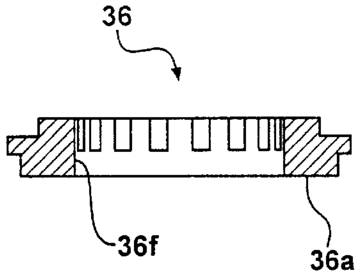
FIGS. 5, 6 and 7 are detail views of a spacer utilized in the master cylinder.
Figure 6:
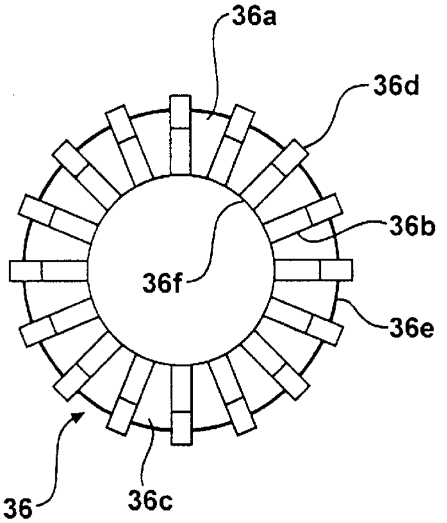
Figure 7:
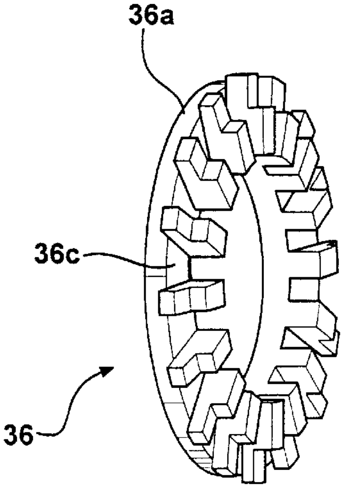
Figure 8:
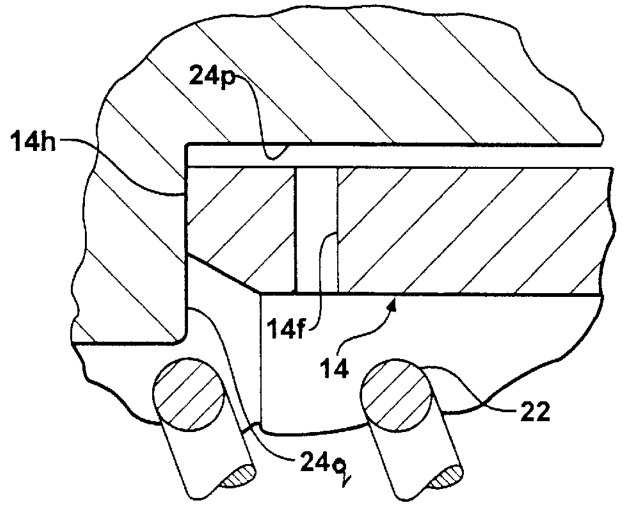
FIG. 8 is a detail view taken within the circle 8 of FIG. 1.

However, in certain situations such as when the operators foot slips off the clutch pedal and the pedal and the piston are returned abruptly to the retracted position, the fluid from the slave cylinder and conduit are unable to in effect keep up with the retreating piston to fill the bore behind the retreating piston. In this case, it is necessary to allow the reservoir to replenish or recoup the cylinder. This recouping flow is allowed by radially inward flexing movement of the outer lip of the primary seal to the dash line position seen in FIG. 3 so as to create a passage from port 24*w* around the outer periphery of the primary seal, around the inwardly flexed lip 32*b*, through the crenel passages 24*n*, and through the axial bore grooves 24*p*.

The use of an extended piston in combination with the recuperation grooves allows the piston to be firmly and totally supported and guided at all times while retaining the ability of the cylinder to recoup in front of the retreating piston to ensure that the bore forwardly of the retreating piston remains full even in extremely rapid piston retractions.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A master cylinder comprising:

a casing defining a bore, an annular groove surrounding the bore between forward and rearward ends of the bore and defining a forward bore portion forwardly of the annular groove and a rearward bore portion rearwardly of the annular groove, and a port connecting the annular groove with a reservoir for containing hydraulic fluid;

a seal positioned in the annular groove;

a piston mounted for stroking movement between extended and retracted positions and having a forward end positioned forwardly of the annular groove in a rearward section of the forward bore portion with the piston in its retracted position whereby, in its retracted position, a rear end of the piston is guided in the rearward bore portion and the forward end of the piston is guided in the rearward section of the forward bore portion;

axial groove means at the interface between the forward end of the piston and the rearward section of the forward bore portion establishing communication, with the piston in its retracted position, between the bore forwardly of the piston and the annular groove; and port means in the piston communicating at one thereof with the bore forwardly of the piston and opening at another end thereof exteriorly of the piston at a location, with the piston in its retracted position, rearwardly of the seal.

2. A master cylinder according to claim 1 wherein the groove means comprises a series of circumferentially spaced axially extending grooves in the rearward section of the forward bore portion.

3. A master cylinder according to claim 2 wherein the axial grooves extend into the forward bore portion forwardly of the rearward section of the forward bore portion.

4. A master cylinder according to claim 3 wherein the axial grooves are substantially coextensive with the forward bore portion.

5. A master cylinder comprising a casing formed of a plastic material in a molding operation and defining a bore, an annular groove surrounding the bore between forward and rearward ends of the bore and defining a forward bore portion forwardly of the annular groove and a rearward bore portion rearwardly of the annular groove, and a port connecting the annular groove with a reservoir for containing hydraulic fluid; a seal positioned in the annular groove; and a piston mounted in the bore for stroking movement between extended and retracted positions, characterized in that:

the piston has a forward end positioned forwardly of the annular groove in a rearward section of the forward bore portion with the piston in its retracted position whereby in its retracted position a rear end of the piston is guided in the rearward bore portion and the forward end of the piston is guided in the rearward section of the forward bore portion;

axial groove means are provided at the interface between the forward end of the piston and the rearward section of the forward bore portion establishing communication, with the piston in its retracted position, between the bore forwardly of the piston and the annular groove; and port means are provided in the piston communicating at one end thereof with the bore forwardly of the piston and opening at another end thereof exteriorly of the piston at a location, with the piston in its retracted position, rearwardly of the seal.

6. A master cylinder according to claim 5 wherein the groove means comprises a series of circumferentially spaced axially extending grooves in the rearward section of the forward bore portion.

7. A master cylinder according to claim 6 wherein the axial grooves extend into the forward bore portion forwardly of the rearward section of the forward bore portion.

8. A master cylinder according to claim 7 wherein the axial grooves are substantially coextensive with the forward bore portion.

9. A master cylinder comprising:

a casing defining a bore, an annular groove surrounding the bore between the forward and rearward ends of the bore and defining a forward bore portion forwardly of the annular groove and a rearward bore portion rearwardly of the annular groove, and a port connecting the annular groove with a reservoir for containing hydraulic fluid;

a seal assembly positioned in the annular groove;

a piston mounted for stroking movement between extended and retracted positions and having a forward end positioned forwardly of the annular groove in a rearward section of the forward bore portion with the piston in its retracted position whereby, in its retracted position, a rear end of the piston is guided in the rearward bore portion and the forward end of the piston is guided in the rearward section of the forward bore portion; and axial groove means at the interface between the forward end of the piston and the rearward section of the forward bore portion establishing communication, with the piston in its retracted position, between the bore forwardly of the piston and the annular groove;

the casing defining an annular shoulder defining a forward end of the annular groove and an annular lip projecting rearwardly from the shoulder into the annular groove;

the seal assembly including an annular seal positioned in the annular groove against the annular lip;

the annular lip being crenelated and coacting with the seal to define a plurality of circumferentially spaced crenel passages there between providing fluid communication between the reservoir port and the axial groove means;

the seal including an outer flexible lip moveable in response to variations in fluid pressure between an outwardly flexed position blocking fluid communication between the reservoir port and the crenel passages and an inwardly flexed position allowing fluid communication between the reservoir port and the crenel passages and thereby between the reservoir port and the axial groove means.

10. A master cylinder comprising a casing formed of a plastic material in a molding operation and defining a bore, an annular groove surrounding the bore between forward and rearward ends of the bore and defining a forward bore portion forwardly of the annular groove and a rearward bore portion rearwardly of the annular groove, and a port connecting the annular groove with a reservoir for containing hydraulic fluid; a seal positioned in the annular groove; and a piston mounted in the bore for stroking movement between extended and retracted positions, characterized in that;

the piston has a forward end positioned forwardly of the annular groove and a rearward section of the forward bore portion with the piston in its retracted position whereby in its retracted position a rear end of the piston is guided in the rearward bore portion and the forward end of the piston is guided in the rearward section of the forward bore portion;

axial groove means are provided at the interface between the forward end of the piston and the rearward section of the forward bore portion establishing communication with the piston in its retracted position, between the bore forwardly and the piston and the annular groove;

the casing defines an annular shoulder defining a forward end of the annular groove and an annular lip projecting rearwardly from the shoulder into the annular groove;

the seal assembly includes an annular seal positioned in the annular groove against the annular lip;

the annular lip is crenelated and coacts with the seal to define a plurality of circumferentially spaced crenel passages therebetween providing fluid communication between the reservoir port and the axial groove means; the seal includes an outer flexible lip moveable in response to variations in fluid pressure between an outwardly flexed position blocking fluid communication between the reservoir port and the crenel passages and an inwardly flexed position allowing fluid communication between the reservoir port and the crenel passages and thereby between the reservoir port and the axial groove means.

11. A master cylinder according to claim 10 wherein:

the casing comprises a two part structure including a molded front part and a molded rear part;

the front and rear parts include coacting means for joining the parts in a configuration in which the front part defines the forward bore portion and the axial groove means, the rear part defines the rearward bore portion, and the parts coact to define the annular groove.

12. A master cylinder according to claim 11 wherein:

the annular shoulder comprises a forward annular shoulder;

the annular groove is further defined by a rearward annular shoulder defining a rearward end of the annular groove and a cylindrical groove surface interconnecting the forward and rearward annular shoulders; and in the joined configuration of the front and rear parts the forward annular shoulder, the annular lip, the reservoir port, and the cylindrical groove surface are defined by the front part and the rear annular shoulder is defined by the rear part.

13. A master cylinder according to claim 12 wherein:

the annular seal comprises a primary seal; and the master cylinder further includes a secondary annular seal positioned in the annular groove against the rearward annular shoulder, rearwardly of the primary seal, and rearwardly of the reservoir port.

14. A master cylinder according to claim 13 wherein:

the master cylinder further includes an annular spacer positioned in the annular groove between the primary seal and the secondary seal proximate the reservoir port; and the spacer provides passage means allowing the passage of fluid therethrough.

* * * * *